No. 870,514. PATENTED NOV. 5, 1907.
R. L. HORSLEY.
WIRE COILING MACHINE.
APPLICATION FILED MAR. 2, 1906. RENEWED JULY 24, 1907.
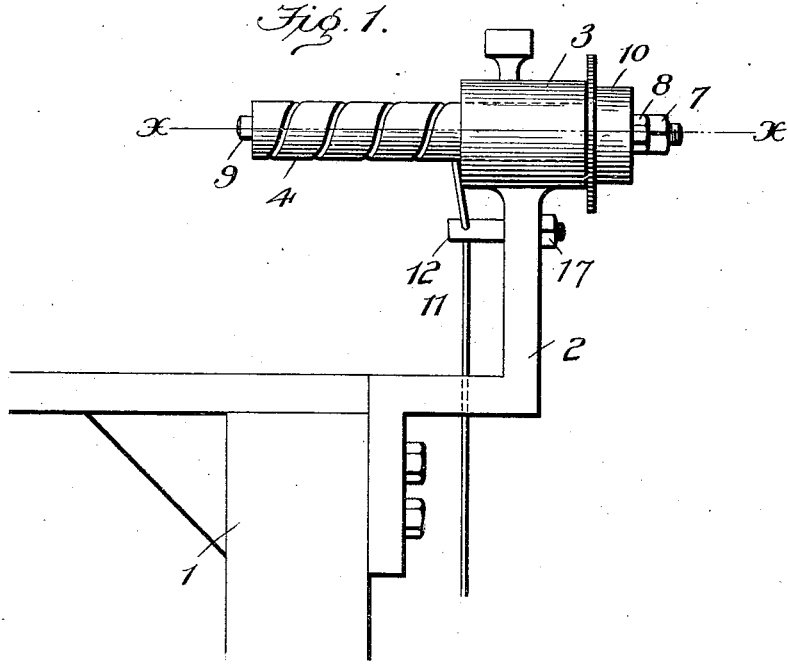
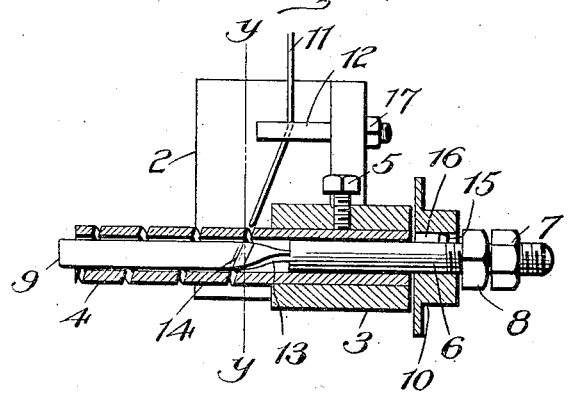
Witnesses
J. W. Stitt
E. Wallington
Inventor
R. L. Horsley,
By A. D. Jackson,
Attorney

UNITED STATES PATENT OFFICE.

ROBERT L. HORSLEY, OF FORT WORTH, TEXAS, ASSIGNOR TO WORTH WIRE WORKS, A CORPORATION OF TEXAS.

WIRE-COILING MACHINE.

No. 870,514.  Specification of Letters Patent.  Patented Nov. 5, 1907.

Application filed March 2, 1906. Serial No. 303,884. Renewed July 24, 1907. Serial No. 385,314.

*To all whom it may concern:*

Be it known that I, ROBERT L. HORSLEY, a citizen of the United States, residing at Fort Worth, Texas, have invented a new and Improved Wire-Coiling Machine, of which the following is a specification.

This invention relates to machines for manufacturing wire coil, and the object is to provide machines for working wire of different temper and of different sizes and coiling the same into coils which are elliptical in cross section and which are adapted for the manufacture of such articles as door mats and the like.

Other objects and advantages will be fully explained in the following description and the invention will be more fully pointed out in the claims.

Reference is had to the accompanying drawings which form a part of this application and specification.

Figure 1 is a side elevation of the machine. Fig. 2 is a horizontal section of the machine taken on the line $x$—$x$ of Fig. 1. Fig. 3 is a cross section of the forming blade or former taken on the line $y$—$y$ of Fig. 2.

Similar characters of reference are used to indicate the same parts throughout the several views.

This machine is mounted on any suitable support or platform 1. The machine has a frame 2 which may be bolted to the support 1. A cylindrical casing 3 forms the upper part of the machine. A feeder 4 is mounted in the casing 3 rigidly by means of a set screw 5. The feeder 4 may be set at different adjustments by loosening the set screw 5 and moving the feeder to the desired adjustment. This may be done to bring the feeder and the former 9 into proper operative relation. The former terminates with a cylindrical portion or shaft 6 which is threaded near the end. This former moves freely in the feeder 4 and is held in place by the nut 8 and the jam-nut 7. The nuts 7 and 8 hold the former 9 against displacement by reason of the wire passing through the feeder 4, the tendency being to draw the former in the direction of the moving coil. The former 9 is driven by the pulley 10. The pulley 10 is movable axially on the rod or shaft 6 and a key 15, which is rigid in the rod 6, moves in a slot 16 in the pulley 10. A wire 11 is fed to the machine from any suitable supply source. An adjustable guide 12 for directing the wire to the machine is mounted in the frame 2. The guide 12 is made adjustable by a nut 17 which may be screwed further on or further off of the end of the guide 12. The feeder 4 consists of a tube having a spiral slot cut therein for receiving and feeding the wire, or which takes the wire coil from the former 9. The spiral slot may be cut out larger or flared at the point where it receives the wire 11 so that the edge of the slot will not shear the wire. The wire is directed and drawn by the slot in the tube and the flight of the coil is partly determined by the spiral feeder. The former consists of a blade 9 and the spindle portion or rod 6. The blade 9 is twisted approximately 45 degrees at the point 13. The twisted portion of the blade terminates in slight grooves 14 diagonally across the blade on opposite sides thereof so that a cross section of the former 9 on the line $y$—$y$ will show a form or appearance as illustrated in Fig. 3. This is done to take away the rounded portion caused by twisting and to provide a flat surface for forming the sides of coils.

The object of twisting the former blade is to adapt the blade to operate on wire of different temper and of different sizes. The twist of the former is at the point where the wire enters the spiral feeder and the major part of the twist does not enter the coil that is being formed. Means are provided for adjusting the former so that more or less of the twist can be let into the coil that is being formed. This is necessary for operating on wire of different sizes and of different temper. With small wire more of the twist must enter the coil, as small wire is more elastic than large wire. Also with hard wire more of the twist must enter the coil because hard wire is more elastic than soft wire. The coil manufactured by such machine as is herein described has two substantially flat sides and these flat sides are substantially opposite the flat sides of the former during manufacture of the coil, and the object of the twist at the starting point is that the wire may be bent far enough beyond the plane of the coil already formed so that the rebound of the wire will be just sufficient to bring the flat part of the coil being formed in the plane of the coil already formed. There is a short bend of the wire on each side of the coil and these short bends of the wire are formed on and engage the edges of the former. These bends are made uniform by the edges of the former so that the flat side of each flight of the coil when completed will be in the same plane as the flat sides of the coil already formed, and the edges or short bends of the wire will continue in the same straight lines. Thus the coil will be flat from end to end with no twists therein, however long the coil may be.

Having fully described my invention, what I claim as new and desire to secure by Letters Patent, is,—

1. A wire coiling machine comprising a spiral feeder and a former rotating in said feeder, said former consisting of a blade twisted substantially one eighth and the twisted portion extending a distance substantially only one flight of the spiral feeder and said twisted portion being opposite the receiving portion of said feeder.

2. A wire coiling machine comprising a spiral feeder and a former rotating in said feeder, said former consisting of a blade twisted only at the receiving portion of said feeder, a part of said twisted portion entering in the coil being formed.

3. A wire coiling machine comprising a spiral feeder and a former rotating in said feeder, said former consisting of a blade having a twisted section entering slightly within the coil being formed and a straight section forward of the coil being formed.

4. A wire coiling machine having a shaft carrying a former, said former having a twisted section at the commencement of the formation of the coil and a straight section forward of the formation of the coil.

5. In a wire coiling machine, the combination of a feeder, a rotating former operating in said feeder and having a twisted section at the receiving portion of said feeder to regulate the formation of the coil, and means for axially adjusting said former whereby the twisted portion of said former may be varied relative to the receiving portion of said feeder for operating on wire of different sizes and different temper.

6. In a wire coiling machine, the combination of a feeder, a former having a twisted section at the receiving portion of said feeder, said twisted section terminating in slight grooves on opposite sides thereof, and means for driving said former.

In testimony whereof, I set my hand in the presence of two witnesses, this 9th day of February, 1906.

ROBERT L. HORSLEY.

Witnesses:
A. L. JACKSON,
J. W. STITT.